United States Patent [19]

Nagoshi et al.

[11] Patent Number: 4,965,596

[45] Date of Patent: Oct. 23, 1990

[54] INK JET RECORDING APPARATUS WITH WASTE INK DISTRIBUTION PATHS TO PLURAL CARTRIDGES

[75] Inventors: Shigeyasu Nagoshi, Tokyo; Koji Terasawa, Mitaka; Hideki Yamaguchi, Yokohama, all of Japan

[73] Assignee: Canon Kabushiki Kaisha, Tokyo, Japan

[21] Appl. No.: 307,505

[22] Filed: Feb. 8, 1989

[30] Foreign Application Priority Data

Feb. 9, 1988 [JP] Japan ................................ 63-026503
Apr. 26, 1988 [JP] Japan ................................ 63-103597

[51] Int. Cl.$^5$ ................................ G01D 15/18
[52] U.S. Cl. ................................ 346/140 R
[58] Field of Search ................................ 346/75, 140

[56] References Cited

U.S. PATENT DOCUMENTS 4,403,233 9/1983 Terasawa .
4,410,900 10/1983 Terasawa .
4,437,104 3/1984 Hudson ................ 346/140 R
4,447,820 5/1984 Terasawa .
4,492,969 1/1985 Terasawa .
4,506,277 3/1985 Terasawa .
4,510,510 4/1985 Terasawa .
4,543,589 9/1985 Terasawa .
4,556,894 12/1985 Terasawa ................ 346/140 R
4,600,931 7/1986 Terasawa .
4,636,814 1/1987 Terasawa .
4,682,184 7/1987 Terasawa ................ 346/140 R
4,695,824 9/1987 Tazaki ................ 346/140 R
4,695,851 9/1987 Terasawa ................ 346/140 R
4,739,340 4/1988 Terasawa .
4,819,012 4/1989 Kiyohara et al. ................ 346/140 R

*Primary Examiner*—George H. Miller, Jr.
*Attorney, Agent, or Firm*—Fitzpatrick, Cella, Harper & Scinto

[57] ABSTRACT

An ink jet recording apparatus includes first and second cartridges, each containing ink and a water ink collection unit and detachably mounted on the apparatus, a recovery mechanism for performing recovery operation for a recording head, and a distribution path for distributing the waste ink generated in the recovery operation into the waste ink collection units of the first and second cartridges.

15 Claims, 12 Drawing Sheets

INK JET RECORDING APPARATUS WITH WASTE INK DISTRIBUTION PATHS TO PLURAL CARTRIDGES

BACKGROUND OF THE INVENTION

1. Field of the Invention

The present invention relates to an ink reservoir for an ink jet recording apparatus, and, more particularly, it is concerned with an ink reservoir for an ink jet recording apparatus, which has solvent problems in connection with an ink storing tank and the disposal of a waste ink collecting tank.

2. Related Background Art

A polychromatic ink jet printer is provided with a plurality of ink cassettes, each containing therein an ink tank which stores different colors of ink. These ink cassettes are installed in the printer in a freely mountable and dismountable manner. The inks in various colors stored in the ink cassettes are used for printing numerical figures and letters, or for producing picture images in monochrome or in polychrome using the various ink colors in combination. The colors of the ink which are typically used are cyan, magenta, yellow and black. For letter printing, black ink is usually used. For picture images output, black and the three other colors in combination are used.

For a color ink jet printer utilizing black ink color inks, the U.S. Pat. No. 4,695,824 proposes to provide a unit for holding waste ink by absorption only of ink in the black ink cartridge, thereby disposing of the waste ink by the replacement of the black ink cartridge that has a higher frequency of use and replacement thus achieving compactization of the apparatus.

Also the U.S. Pat. No. 4,437,104 proposes to provide a cartridge incorporating three color inks with an integral ink absorbent material. Such a structure, however, does not allow appropriate replacement of each color ink since all the inks used in the apparatus are incorporated in a single cartridge, and the ink absorbent material has to be made large in consideration of the amount of waste ink from the cartridge.

The present inventors have found that such conventional structures give rise to new drawbacks in case of a full-color printer or a multi-color printer.

As the result of the increase in full-color recording, the collection of all the waste ink in a black ink cartridge may not be appropriate, as the ink cartridge may have to be replaced when the amount of waste ink exceeds the absorbing capacity of the ink absorbent material even if a considerable amount of black ink still remains in the cartridge.

Also the waste ink reservoir of the black ink cartridge may cause overflow if the color ink cartridges are replaced frequently. Furthermore, when the cartridges are divided into plural colors, it is necessary to provide a waste ink reservoir separately and provide alarming means therefor. Such a arrangement diminishes the convenience of use and complicates the structure of the device.

Also in case of plural cartridges of the same color (including the case of ink of different densities), there may result overflowing or wasting of ink.

SUMMARY OF THE INVENTION

In consideration of the foregoing, an object of the present invention is to provide an ink jet recording apparatus capable of avoiding overflow of waste ink, and improving the convenience of use.

Another object of the present invention is to provide an ink jet recording apparatus capable of solving the above-mentioned drawbacks and using the ink without waste.

Still another object of the present invention is to provide an ink jet recording apparatus capable of directly detecting the remaining amount of ink and determining the distribution of waste ink, thereby better correlating the remaining amount of the ink and the absorbed amount of the waste ink.

Still other objects of the present invention become will fully apparent from the following description.

According to the present invention, the waste ink is received by waste ink reservoirs provided in two or more cartridges. It is therefore possible either to introduce the waste ink in a waste ink reservoir when another reservoir becomes full, or to simultaneously guide the waste ink into all the waste ink reservoirs thereby reducing the amount of waste per reservoir. There can thus be prevented the drawback of forming the waste ink reservoir only in a cartridge, that the cartridge has to be replaced before the ink contained therein still remains, as the waste ink reservoir becomes full.

Also according to the present invention, the above-mentioned objects are achieved by providing waste ink collecting means for recovering waste ink, discharged from the nozzles of the recording head, into waste ink reservoirs of plural ink cartridges.

As the waste ink collecting means, there can be provided an ink absorbent member between an ink collection path and the waste ink reservoir of each ink cartridge.

The above-mentioned structure realizes averaged collection of the waste ink discharged to the ink recovery path into waste ink reservoirs of plural ink cartridges, corresponding to the collection into a large single waste ink reservoir. Also the overflow can be avoided since each replacement of the ink cartridge provides a new waste ink reservoir.

Also the use of an ink absorbent member as the ink collecting means maintains the waste ink reservoirs in a mutually communicating state, so that the waste ink is distributed in approximately equal amounts in the waste ink reservoirs and the overflowing in a particular reservoir can be prevented.

DESCRIPTION OF THE PREFERRED EMBODIMENTS

At first the entire apparatus will be explained with reference to FIG. 5, and a first embodiment of the present invention will be explained with reference to a schematic view shown in FIG. 1.

Figure 5:
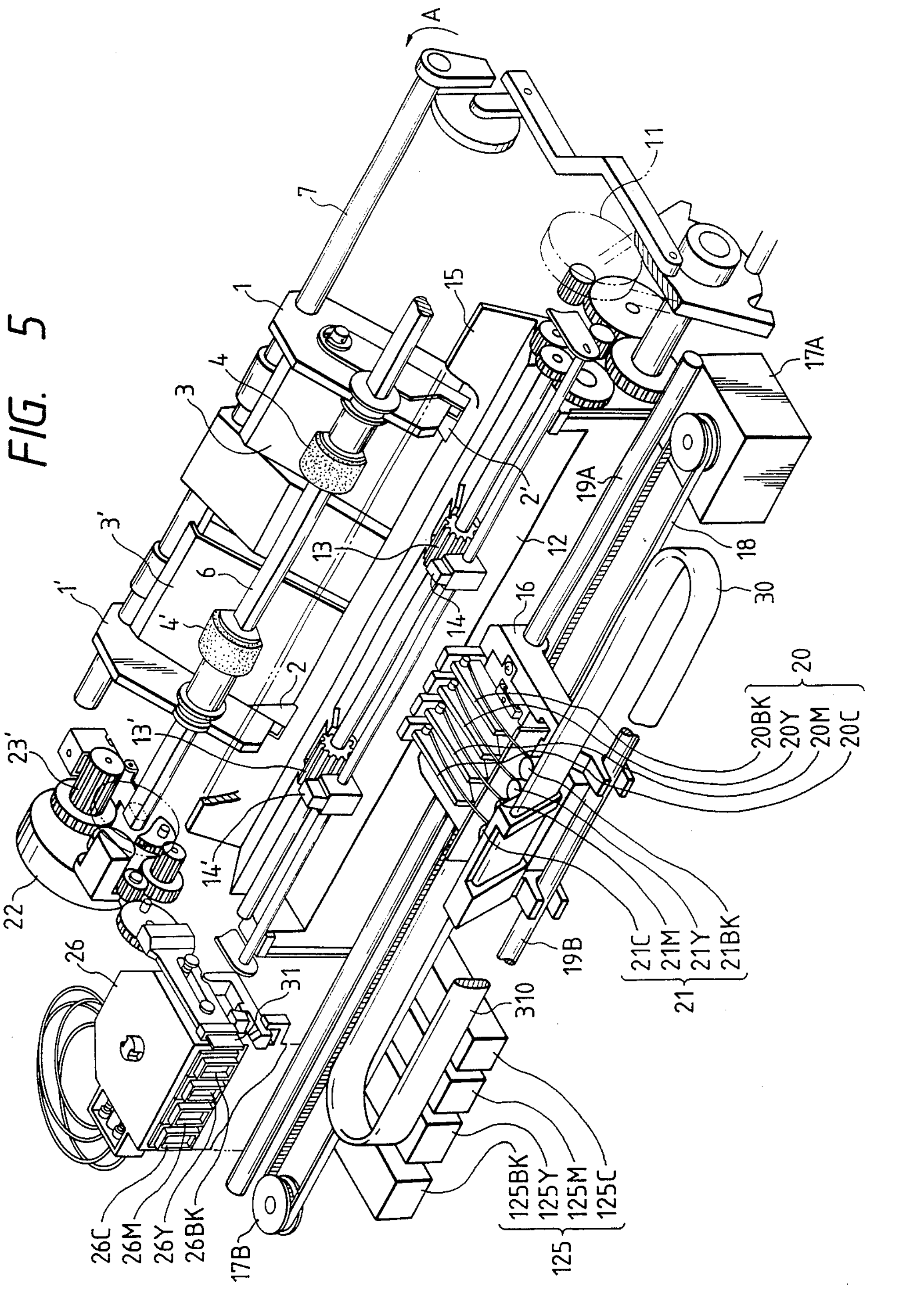
FIG. 5 is a perspective view showing an ink jet recording apparatus of the present invention.

Referring to FIG. 5, sliders 1, 1' constituting a part of a recording medium holder are slidably provided on a slider shaft 7 and can be independently moved along the shaft 7 to match the width of the recording medium. Separating claws 2, 2' provided respectively on the sliders 1, 1' separate the recording media one by one, in cooperation with separating rollers 4, 4'. Pressure plates 3, 3' constituting the bottom of the recording medium holder are biased upwards by unrepresented respective springs, thereby enabling appropriate engagement of the recording medium with the separating rollers 4, 4' regardless of the amount of the stored recording media.

An auto sheet feed (ASF) motor 22 is coupled with an end of a separating roller shaft 6 through a transmission mechanism 23. The ASF motor 22 drives or rotates the separating rollers 4, 4' clockwise through the transmission mechanism 23, thereby separating the recording media one by one and advancing them into a sheet feed path, in cooperation with the separating claws 2, 2'.

A sheet transport motor 11 is coupled, through a transmission mechanism to an end of a sheet transport rollers provided in a suitable position in the path of the recording medium advanced by the separating rollers 4, 4'. The motor 11 drives or rotates the sheet transport roller through said transmission mechanism, thus achieving the transportation of the recording medium.

There are also provided a platen 12 provided above the sheet transport roller and extending over the entire width of the recording medium, thereby defining a flat recording surface for the recording head; and sheet discharge rollers 13, 13' positioned along the transport path, at the downstream side of the platen 12. Pawl units 14, 14' are provided with rowels which are respectively paired with the discharge rollers 13, 13' and engage with the recording surface of the recording medium thereby guiding the same toward a sheet discharge tray. The recording medium 33 after the recording is discharged to the upper part of the recording apparatus by the above-explained construction of the platen 12 and the discharge rollers 13, 13', and is guided to a discharge tray through a discharge guide member 15.

A recording head 20 is provided with nozzles for emitting ink toward the recording surface of the recording medium, defined by the platen 12. In this case there are provided four recording heads 20BK, 20Y, 20M, and 20C respectively corresponding to the colors of the inks employed, for example black, yellow, magenta and cyan. An electrothermal or electromechanical converting element is provided in a suitable position in the ink path, for example in the nozzle, for applying energy for discharge to the ink in response to externally supplied drive signals, thereby causing the emission of ink from the orifice of the nozzle. A carriage 16, supporting the recording heads 20, is connected to a driving belt 18 and is slidably supported by two guide shafts 19A, 19B extending parallel to the platen 12, whereby the recording heads 20 can reciprocate over the entire width of the recording medium.

A head driving motor 17, positioned in the vicinity of an end of the reciprocating path of the recording heads 20, supports a pulley 17A, which is linked by a belt 18 with another pulley 17B positioned at the other end of the reciprocating path. The rotation of the head driving motor 17 is converted into a linear motion by the belt 18, and is transmitted to the carriage 16 fixed thereto. Consequently the recording heads 20 can perform reciprocating motion in the transverse direction of the recording medium.

A head recovery device 26, provided at an end of the moving path of the recording heads 20 outside the recording range thereof, for example at a home position, can perform an operation of capping the recording heads 20BK–20C respectively with caps 26BK–26C and an operation of retracting the caps from the moving path of the recording heads 20, by the suitable construction of the transmission mechanism 23, in response to the function of the ASF motor 22. An emission recovery process, such as the removal of viscofied ink from the nozzles, can be achieved by sucking the ink with suitable suction means provided in the head recovery device 26, thereby forcedly expelling the ink from the nozzle orifices, in relation to the capping operation of the head recovery device 26 on the recording heads, 20. Also the recording heads can be protected by the capping after the end of a recording operation.

A wiper member 31 is provided on a lateral face of the head recovery device 26 for wiping the ink emitting face of the recording heads 20.

Auxiliary ink tanks 21BK–21C are provided also on the carriage 16, respectively in combination with the recording heads 20BK–20C. In FIG. 5, only the recording head 20BK and the auxiliary ink tank 21BK can be seen entirely, and others are positioned in rear position. Ink cartridges 125BK–125C, incorporating ink tanks for ink supply to the recording heads 20BK–20C through the auxiliary ink tanks 21BK–21C, are detachably mounted on the apparatus. In consideration of efficiency of replacing operation and space, the ink cartridges 125BK–125C are respectively provide with integral waste ink absorbent members 125BK-2–125C-2 for receiving the waste ink generated during the discharge recovery operation. There are also shown a flexible ink pipe member 30 collectively incorporating ink supply pipes between the ink tanks in the ink cartridges 125 and the auxiliary ink tanks 21; and a flexible cable 31 for supplying the recording heads 20 with drive signals.

Figure 1:
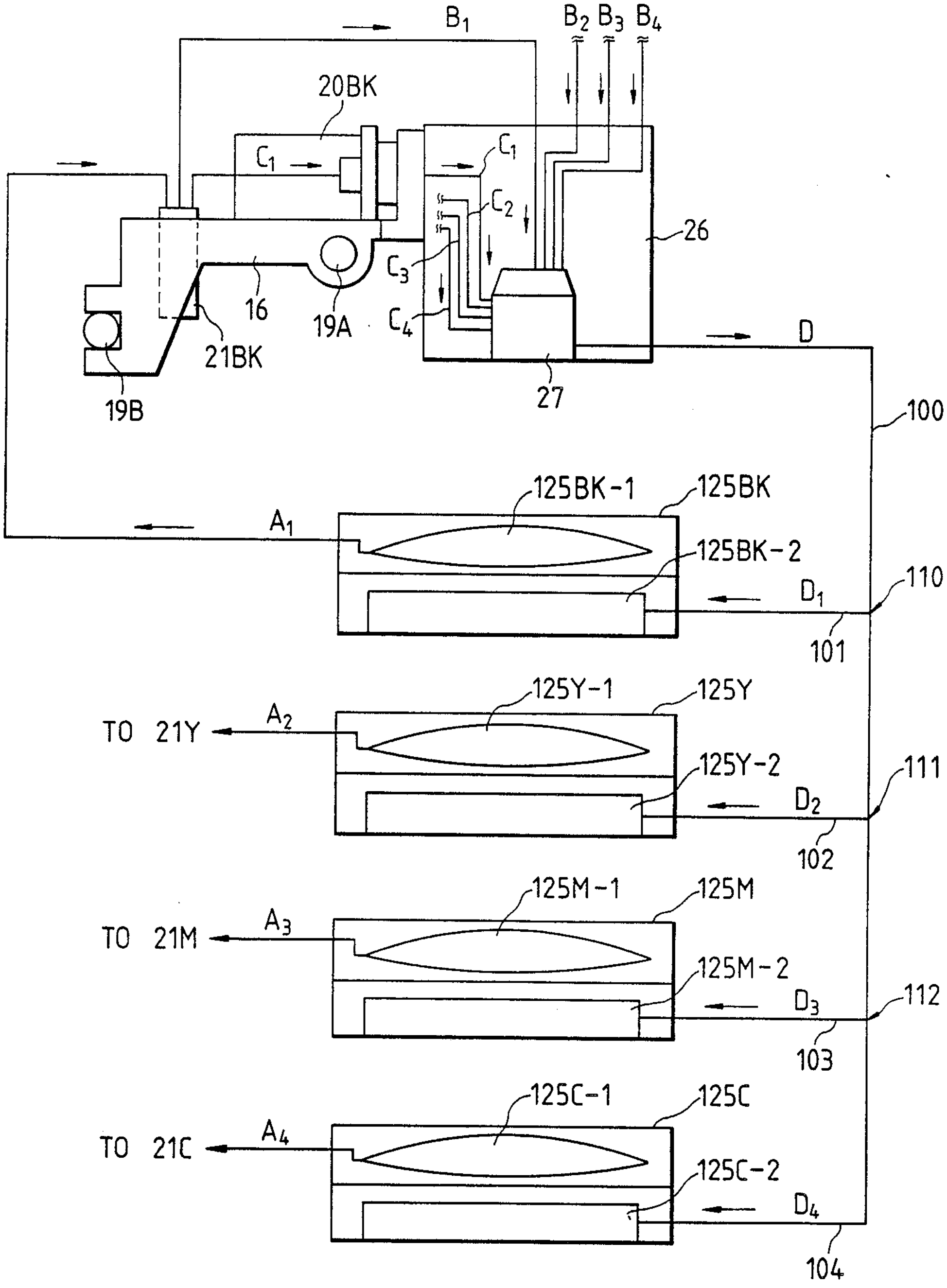
FIG. 1 is a schematic view of an ink system representing an embodiment of the present invention.

FIG. 1 shows an example of the ink system in the ink jet recording apparatus shown in FIG. 5, in which ink tanks 125BK-1–125C-1 of flat and flexible bag form, composed of aluminum or plastic, are respectively incorporated in the ink cartridges 125BK–125C.

There are also shown flexible ink supply pipes or ink paths A1–A4 connecting the ink tanks 125BK-1–125C-1 respectively with the auxiliary ink tanks 21BK–21C; ink paths C1–C4 respectively leading from the auxiliary ink tanks 21BK–21C through the recording heads 20BK–20C to the pump 27 in the head recovery device 26; ink paths B1–B4 for connecting the auxiliary ink tanks 21BK–21C with the pump 27 for sucking unnecessary ink or air therefrom; and an ink path D for connecting the pump 27 with the ink absorbent member 125BK-2 thereby guiding the waste ink thereto at the emission recovery operation and the suction operation involving the auxiliary ink tanks 21.

In FIG. 1, the ink cartridges 125BK–125C are constructed identically for all the colors, namely black, yellow, magenta and cyan, and are respectively provided with ink tanks 125BK-1–125C-1 and waste ink absorbent members 125BK-2–125C-2. The waste ink path D from the pump 27 is branched into paths D1–D4, which respectively communicate the said waste ink absorbent members 125BK-2–125C-2.

Consequently the waste ink collected by the pump 27 during the emission recovery operation and during the suction operation relating to the auxiliary ink tanks 21 is received by all the waste ink absorbent members 125BK-2 –125C-2 through the ink paths D and D1–D4.

Thus, the amount of waste ink guided to each waste ink absorbent member is reduced in comparison with the conventional case, and the ink cartridge need not be replaced as frequently as conventional apparatus before the fresh ink therein is used up. Also, the production efficiency of the ink cartridge is improved because all the cartridges can be prepared with same dimension and specifications.

Figure 2:
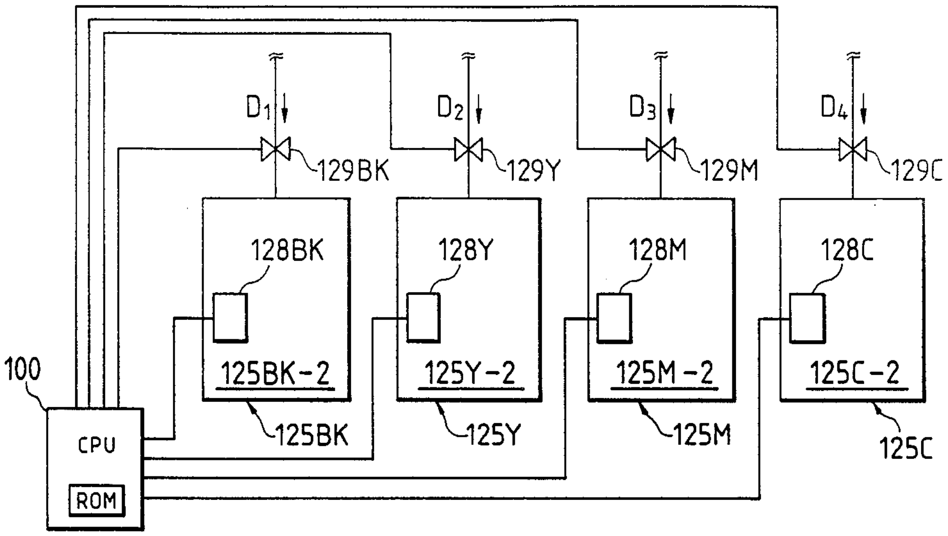
FIG. 2 is a schematic view of an ink system representing another embodiment of the present invention.

FIG. 2 illustrates the principal part of the ink system of another embodiment of the present invention, wherein the components as those in FIG. 1 are represented by same numbers.

Sensors 128BK–128C, provided respectively on waste ink absorbent members 125BK-2–125C-2 for detecting the readiness for receiving the waste ink, are composed of conventionally known means such as electrodes or photocouplers, and each of said sensors generates a signal when the absorbent member reaches the limit of its absorbing capacity and can no longer perform ink absorption. Such a detection signal is supplied to a CPU composed of a microcomputer.

Path open/closing members 129BK–129C, composed for example of solenoid valves and provided in the waste ink paths D1–D4, open or close the waste ink paths under the control of the CPU 100.

Figure 4:
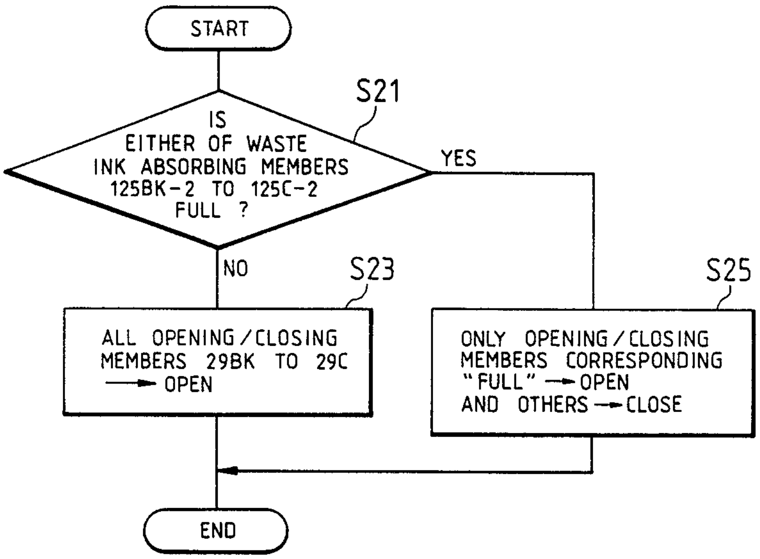
FIG. 4 is a flow chart showing another example of the control sequence in the embodiment shown in FIG. 2.
Figure 3:
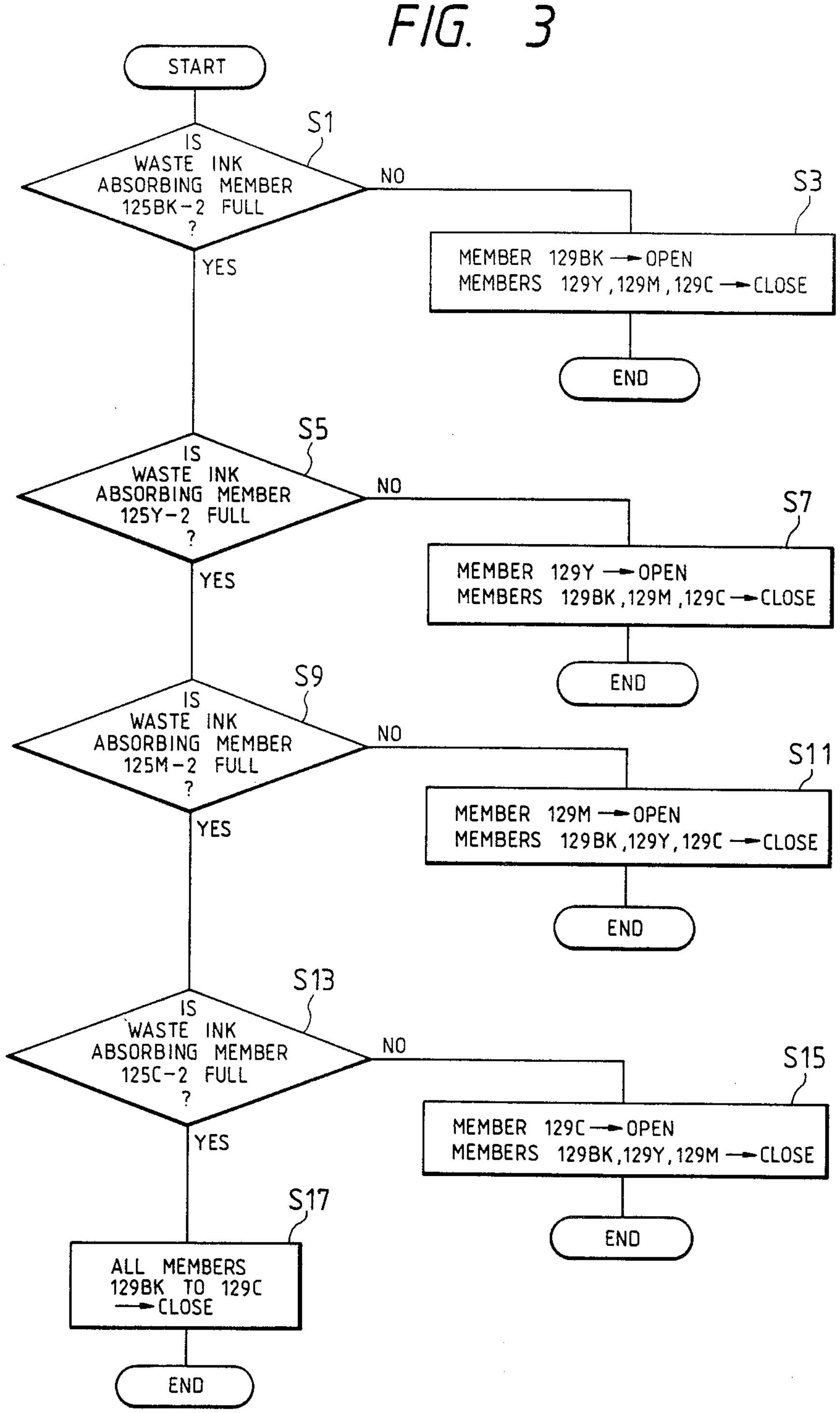
FIG. 3 is a flow chart showing an example of control sequence in the embodiment shown in FIG. 2.

A control unit 100 is provided with a ROM storing programs corresponding to the control sequences to be shown in FIGS. 3 and 4, and controls the members 129BK–129C according to said control sequences and in response to the detection signals from the sensors 128BK–128C.

FIG. 3 shows an example of the control sequence in the embodiment shown in FIG. 2, which can be activated at a suitable timing, for example at the emission recovery operation or the suction operation involving the auxiliary ink tanks.

At first, a step S1 discriminates whether the waste ink absorbent member 125BK-2 provided in the ink cartridge 125BK is full, utilizing the sensor 128BK, and, if the result is negative, a step S3 opens the member 129BK and closes the members 129Y, 129M and 129C. Thus the sequence is terminated, and the waste ink is received only by the waste ink absorbent member 125BK-2 in the ink cartridge 125BK.

If the discrimination in the step S1 turns out affirmative, the sequence proceeds to a step S5 for effecting a similar discrimination with the sensor 128Y as in the step S1, and, if the result is negative, a step S7 opens the member 129Y and closes the members 129BK, 129M and 129C.

If the discrimination in the step S5 turns out affirmative, a similar process is conducted in steps S9 and S11 for the sensor 128M provided on the ink cartridge 125M and the open/closing member 129M. Steps S13 and S15 are similarly executed when the discrimination in the step S9 turns out affirmative.

If the discrimination in the step S15 turns out affirmative, namely if all the waste ink absorbent members 125BK-2–125C-2 are full, the sequence proceeds to a step S17 for closing all the members 129BK–129C thereby closing the paths D1–D4, and giving an alarm to the operator with suitable alarm means, thereby requesting replacement of any or all of the ink cartridges. However, the sequence does not reach this step S17 depending on the amount of ink in the ink tank, or depending on the absorbing capacity of the absorbent member, since, for example, the ink cartridge is replaced when the ink therein is exhausted.

The present embodiment can also achieve similar effects as in the embodiment shown in FIG. 1. In addition it is capable of avoiding the difficulty which may be encountered in the first embodiment due to the difference in the amount of received waste ink, namely that the replacement of an ink cartridge may be required even before the ink therein is used up, if the flow of the waste ink is not uniform and the absorbing capacity is saturated only in a certain absorbent member.

The order of selection of the waste ink absorbent members is not limited to the above-explained sequence but can naturally be selected arbitrarily. For example it is possible to select the waste ink absorbent members in descending order of frequency of use of the inks in the ink cartridges, and such selection minimizes the occurrence of a situation where the ink cartridge is replaced before the waste ink absorbent member thereof is not used at all. It is also possible to render the order of use programmable, according to the content of information to be recorded.

FIG. 4 shows another example of the control sequence in the embodiment shown in FIG. 2. This control sequence can be activated at a similar timing as that of the sequence shown in FIG. 3.

In the present example, a step S21 discriminates the state of all the sensors 128BK–128C, and, if none of the waste ink absorbent members 125BK-2–125C-2 is full, the sequence proceeds to a step S23 for opening all the open/closing members 129BK–129C thereby introducing the waste ink in all the waste ink absorbent members. On the other hand, if any of the waste ink absorbent members is detected to be full, the sequence proceeds to a step S25 for closing an open/closing member in the path leading to the saturated absorbent member. In the present example, if all the waste ink absorbent members are full, there may be executed a process similar to that in the step S17 in FIG. 3, but such process may in fact never be executed as explained before.

This embodiment can achieve similar advantages as in the embodiments shown in FIGS. 1 and 2.

In the foregoing embodiments, the waste ink absorbent members are provided in all the ink cartridges, but they need not necessarily be provided in all of the ink cartridges as long as the effect of the present invention can be effectively achieved. For example the waste ink absorbent members may be excluded in one or two ink cartridges.

Also the colors or species of the inks and the number of the ink cartridges are naturally not limited to those in the foregoing embodiments. Also the waste ink absorbent member is not necessarily an essential structure for receiving the waste ink in the present invention.

Furthermore, the foregoing embodiments have been explained in connection with a serial ink jet recording apparatus in which the recording head is mounted on a carriage and the recording is achieved by moving the carriage in a predetermined direction with respect to the recording medium, but the present invention is naturally applicable effectively and easily to an ink jet line printer equipped with a full-multi type recording head, having nozzles over the entire width of the recording medium.

As explained in the foregoing, the present invention is featured, in an ink jet recording apparatus employing plural ink cartridges for recording, by providing two or more ink cartridges a member for receiving the waste ink, and is therefore capable of preventing the drawback that an ink cartridge has to be replaced before the ink therein is not used up because the waste ink receiving member has become full, as encountered in the conventional apparatus in which the waste ink receiving member is provided only in one of the ink cartridges.

Figure 6:
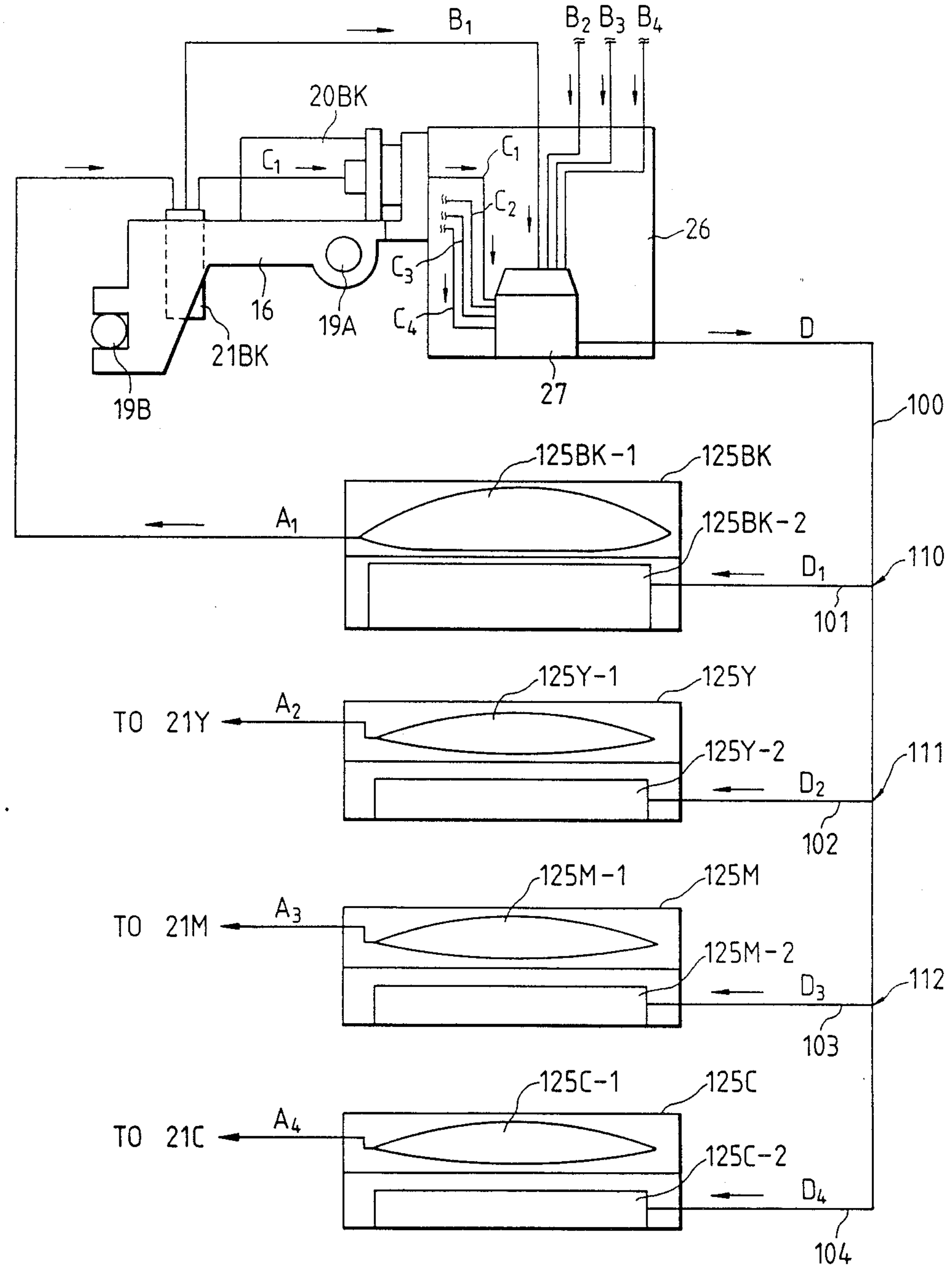
FIG. 6 is a schematic view showing a variation of the embodiment shown in FIG. 1.

The waste ink distributing pipe 100 shown in FIG. 1 has a branching point 110 to a path 101 of the flow D1, a branching point 111 to a path 102 of the flow D2, a branching point 112 to a path 103 of the flow D3, and a final path 104. Below there will be explained another embodiment shown in FIG. 6, in which it is assumed that the branching of flows explained above is maintained to be the same. In this embodiment the amount of black ink and the amount of waste ink received in the black ink cartridge are made three times as large as these of other ink cartridges, and such a structure enables the devise to bring the remaining amount of ink to almost zero and the amount of received waste ink almost to maximum at the ink cartridge replacement, while maintaining the long-term balance of the distribution and collection.

Figure 7:
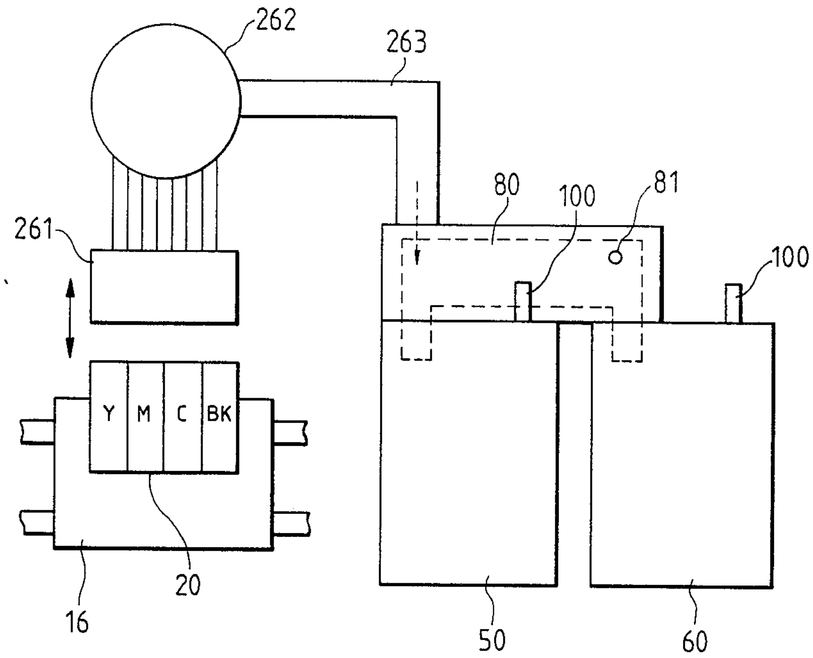
FIG. 7 is a plan view of an ink jet recording apparatus representing another embodiment of the present invention.
Figure 8:
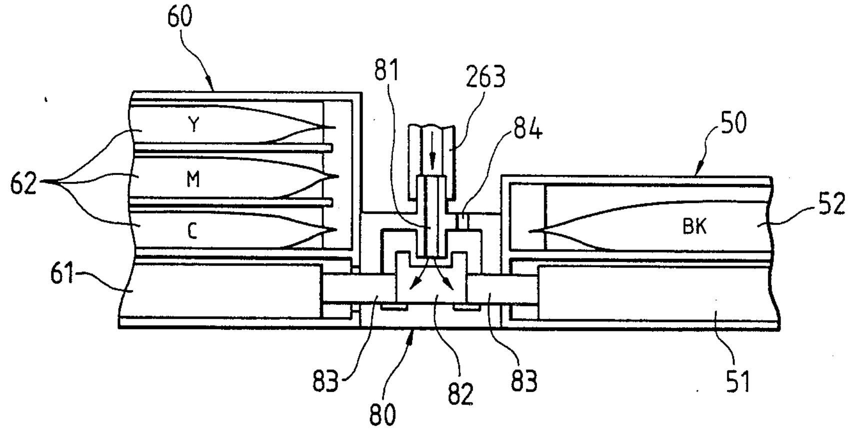
FIG. 8 is a cross-sectional view showing the details of the waste ink recovery means shown in FIG. 7.

FIG. 7 is a plan view showing another embodiment of the ink jet recording apparatus of the present invention, and FIG. 8 is a cross-sectional view showing the details of the waste ink recovery means shown in FIG. 7.

There are shown recording heads 20 for emitting ink droplets of for example, four colors (M: magenta, C: cyan, Y: yellow, B: black); a carriage 16 for moving the recording heads 20 in a predetermined direction; a pump 262 for sucking the inks from the recording heads 20 by a negative pressure; an ink collection path 263 connected to the pump 262; a black cartridge 50 connected to the ink collection path 263; a cartridge 60 of other colors positioned next to the black cartridge 50; and a capping mechanism 261 to be fitted on the nozzles of the recording heads 20 at the ink collection.

As shown in FIG. 7, the waste ink recovery means is completed by a waste ink buffer 80 positioned between the ink collection path 263 and the waste ink reservoirs in the black ink cartridge 50 and the color ink cartridge 60. As shown in FIG. 8, the waste ink buffer 80 is provided with a coupling portion 81 to be coupled with the ink recovery path 263; a buffer absorbent member 82 composed of a porous material and positioned opposite to the entrance thereof; communicating absorbent members 83 composed of a porous member and positioned to connect the buffer absorbent member 82 with waste ink reservoirs 51, 61 of the cartridges 50, 60; and a vent 84 formed on the upper face of the coupling portion 81. There are provided ink bags 52, 62 for containing black and color inks.

In the above-explained structure, when the capping mechanism 261 is placed on the ink emitting face of the recording heads 20 and the pump 262 is activated, inks of different colors are ejected from the nozzles of the recording heads 20. The ejected waste ink is supplied through the pump 262 to the ink recovery path 263, and enters the waste ink buffer 80, in which the ink is supplied through the path in the coupling portion 81 to the buffer absorbent member 82. The waste ink is then absorbed by the neighboring communicating absorbent members 82. The members 83 cause gradual penetration of the absorbed waste ink toward the waste ink reservoirs 51, 61, in which the waste ink is gradually collected. The air in the waste ink buffer 80 is discharged to the outside through the vent 84, so that a negative or positive pressure will not be created in the waste ink buffer 80. Reference numeral 100 denotes an aperture open to the outside, for the absorbent member.

The waste ink reservoirs 51, 61 are composed of a porous material with open pores or fibrous non-woven cloth and have a very high absorbing capacity. Consequently there will not result a situation in which the waste ink is absorbed only in an ink cartridge. More specifically, if one of the waste ink reservoirs absorbs the waste ink and the ink absorbing ability thereof is reduced, the waste ink is then principally absorbed in the other reservoir, so that the ink absorption is always conducted in a balanced manner. The sizes of the waste ink reservoirs 51, 61 may be mutually equal, but they may be optimized according to the capacities of the ink bags 52, 62 or the operating state of the pump 262, in order to better prevent the overflow of the waste ink.

Figure 9:
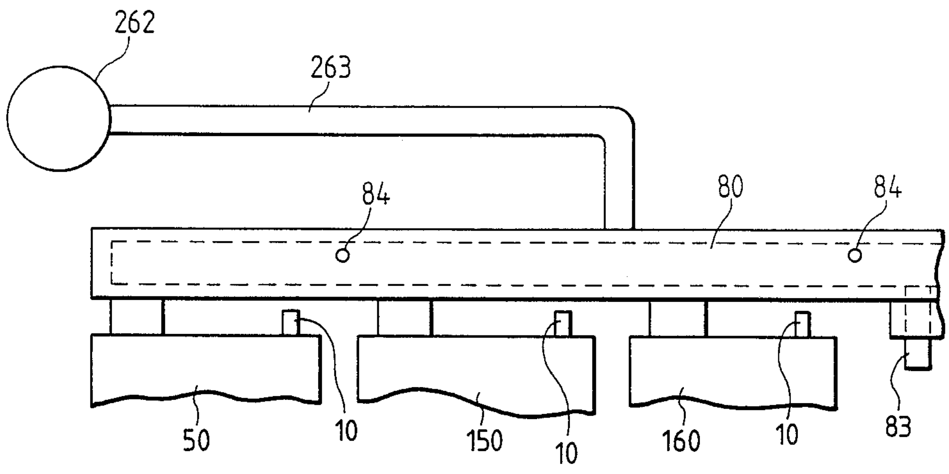
FIG. 9 is a plan view of a waste ink collecting means representing still another embodiment of the present invention.

FIG. 9 is a plan view showing the details of waste ink recovery means representing another embodiment of the present invention.

In the present embodiment an ink cartridge is provided for each color, in contrast to the foregoing embodiment in which the color cartridge 60 incorporates color inks of three colors. Consequently the waste ink buffer 80 is so extended as to be connected to waste ink reservoirs 151, 161, . . . of the ink cartridges 150, 160, . . . , and a vent 84 is provided for each cartridge.

Figure 10:
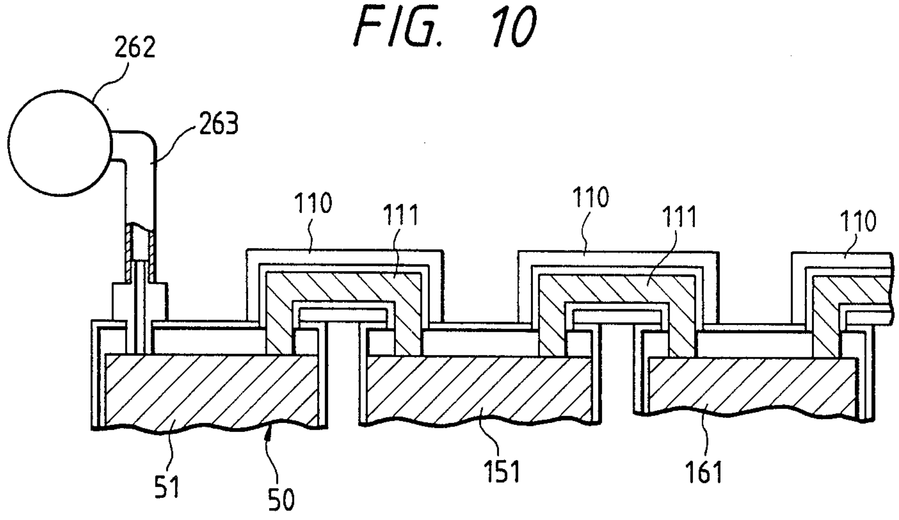
FIG. 10 is a cross-sectional view showing the details of the waste ink jet recovery means representing still another embodiment of the present invention.

FIG. 10 is a cross-sectional view showing the details of waste ink recovery means representing still another embodiment of the present invention.

In the present embodiment, the waste ink buffer 80 employed in the embodiment shown in FIG. 9 is dispensed with, and the waste ink reservoirs 51, 151, 161 of the ink cartridges 50, 150, 160 of different colors are mutually connected with connectors 110 incorporating connecting absorbent members 111. The connecting absorbent member 111 is composed of a material with good absorption and penetration, similar to that constituting the communicating absorbent member 83.

When the amount of the ink in the waste ink reservoir 51 connected to the ink recovery path 263 reaches a certain level, the waste ink is then absorbed in the waste ink reservoir 151 of the adjacent ink cartridge, through the connecting absorbent member 111. In this manner the waste ink does not concentrate in a particular reservoir, but is received in the waste ink reservoirs in successive order, starting from the waste ink reservoir closest to the ink collection path 263. Even if a considerable amount of waste ink is absorbed in the connecting absorbent member 111, it is absorbed by capillary action in the waste ink reservoir of a newly replaced ink cartridge, so that approximately equal amounts of waste ink are stored in all the waste ink reservoirs. Consequently there can be prevented waste ink from overflowing from a particular waste ink reservoir.

As explained in the foregoing, there is provided, according to the present invention, waste ink recovery means for guiding the waste ink, ejected from the nozzles of the recording heads, into the waste ink reservoirs of plural ink cartridges. Consequently, the waste ink from the nozzles is dispersed among plural waste ink reservoirs, and the waste ink recovering capacity is restored at each replacement of the ink cartridge. It is therefore rendered possible to prevent overflowing of the waste ink from a particular waste ink reservoir, and thus to avoid smearing in the recording apparatus.

Also the mutual connection of the waste ink reservoirs with the ink absorbent members enables uniform absorption of the waste ink in plural waste ink reservoirs, causing said plural waste ink reservoirs to function as a single large reservoir.

Figure 11:
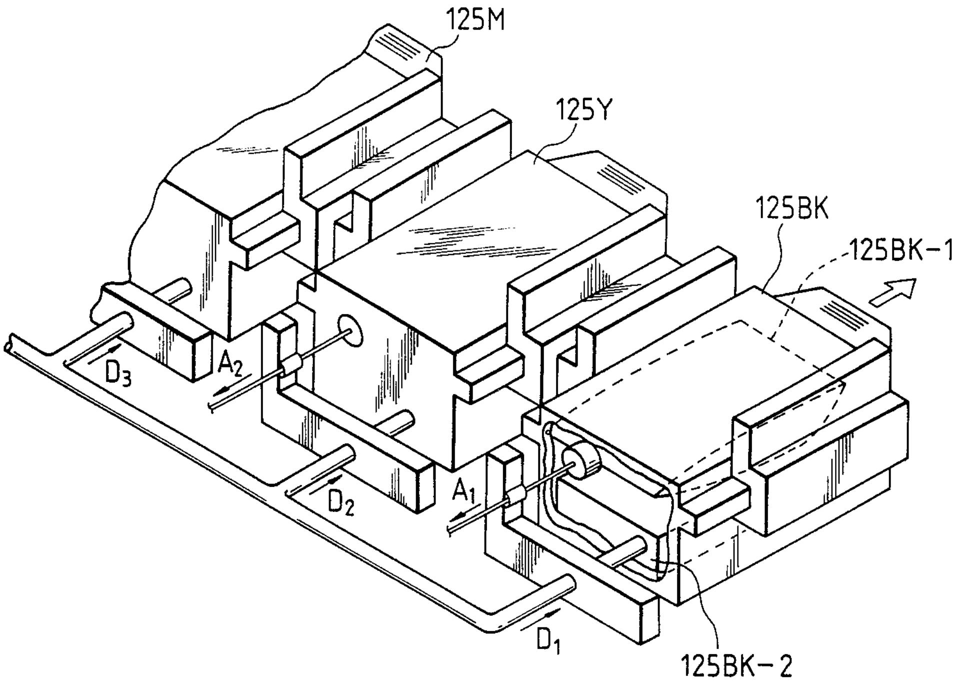
FIG. 11 is a perspective view showing an example of a waste ink distributing pipe in the cartridges shown in FIG. 1.

An embodiment shown in FIG. 11 employs horizontally elongated ink cartridges incorporating absorbent members and detachably mounted on the apparatus, in contrast to the vertically elongated cartridges shown in FIG. 1. In the present embodiment, positioning projections laterally extending from the side walls of the cartridge are fitted with rails formed on the apparatus, whereby an end needle portion of the ink supply pipe of the apparatus engages with an ink supply portion of the cartridge, and one of waste ink supply pipes 101–104 of the apparatus is coupled with a waste ink reservoir of the cartridge. Consequently, the distributed waste ink can be easily introduced into the cartridge by the mounting thereof, and the waste ink leaking at the detaching and mounting of the cartridge can be prevented since, even if a cartridge is detached, the waste ink can be collected in other cartridges.

Figure 12:
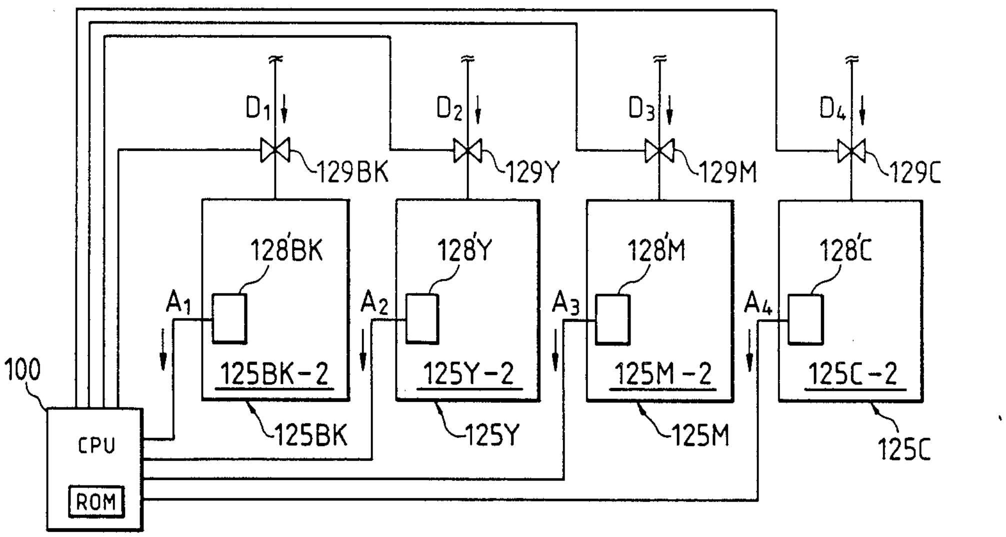
FIG. 12 is a schematic view of another embodiment of the present invention, constituting a variation of the embodiment shown in FIG. 2.
Figure 13:
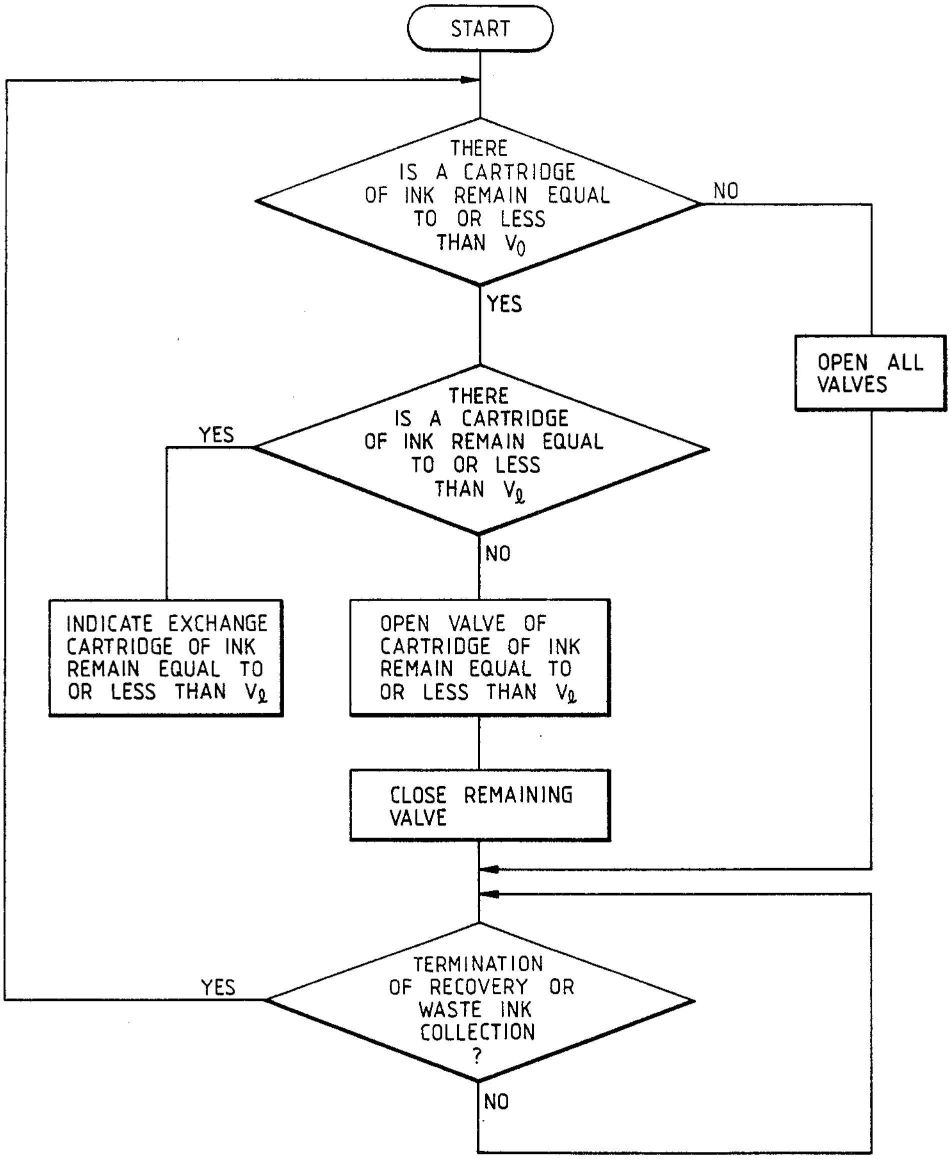
FIG. 13 is a flow chart showing the control sequence of the embodiment shown in FIG. 12.

Now reference is made to FIGS. 12 and 13 for explaining another embodiment of distribution control of the waste ink. In the present embodiment, each of ink amount sensors 128'BK, 128'Y, 128'M, 128'C compares the amount of remaining ink in each cartridge with two reference values $V_0$, $V_l$ ($V_l < V_0$), and sends the result of the comparison to the CPU. The sensor can be selected from various types, such as a photosensor detecting the deformation of an ink bag, or a sensor with electrodes for detecting the remaining amount from the ink resistance. In the present embodiment, a highly precise detecting ability is required in said sensor. The reference value $V_0$ is for example selected equal to or less than $\frac{1}{4}$ of the entire ink amount, preferably an ink amount capable of printing 10 sheets or less. The reference value $V_l$ is selected as an ink amount capable of printing of several lines, or a zero ink amount.

The control sequence shown in FIG. 13 is executed constantly during the activated state of the main apparatus, and is terminated when the power supply to the apparatus is turned off.

At first the sensors 128' (BK, Y, M, C) discriminate respectively whether the remaining ink amount in each cartridge is equal to or less than the value $V_0$. As the remaining amount is larger than $V_0$ in each cartridge in the initial stage, all valves 129 (BK, Y, M, C) are opened so that the waste ink can be distributed into all the cartridges. The comparison with the value $V_0$ is conducted after each emission recovery operation or waste ink recovery operation. If the remaining ink amount becomes equal to or less than $V_0$ at least in one of the cartridges, there is further discriminated whether the remaining amount is equal to or less than $V_l$. If the remaining amount is equal to or less than $V_l$, the corresponding cartridge is no longer usable so that a display is made for requesting the cartridge replacement. However, there is usually found a state in which the remaining amount is larger than $V_l$ but equal to or less than $V_0$, and, in such state, it is preferable to concentrate the waste ink to the absorbent member (waste ink reservoir) of a cartridge identified as requiring replacement soon. Such an operation is realized in the present embodiment, by opening the valve only for the cartridge of which the remaining ink amount is larger than $V_l$ and is equal to or less than $V_0$, and closing the values for other cartridges. If, before the remaining amount of the cartridge reaches $V_l$, that of another cartridge reaches a state larger than $V_l$ but equal to or less than $V_0$, the valve for the latter cartridge is also opened to improve the efficiency of waste ink collection.

In any case, when a cartridge with the remaining amount equal to or less than $V_l$ is replaced, a new cartridge has a full ink amount and a maximum ink absorbing capacity. In this manner efficient dispersed ink recovery can be stably achieved over a prolonged period.

Figure 14:
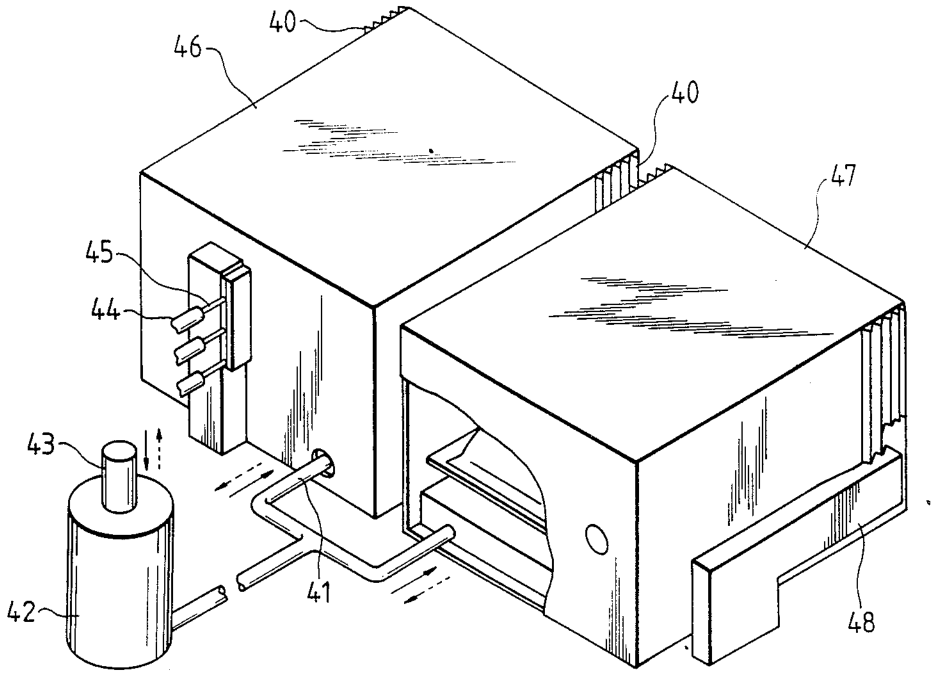
FIG. 14 is a schematic view of a variation of the embodiment shown in FIG. 7.
Figure 15:
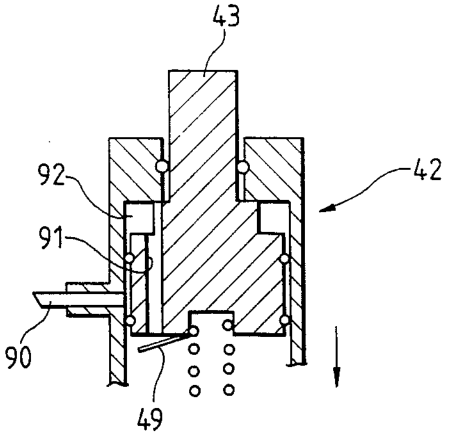
FIG. 15 is a schematic view of an example of pump employable in the present invention.

FIG. 14 is a perspective view showing a variation of the embodiment shown in FIGS. 7 and 8, employing ink distributing pipes shown in FIG. 1 and a color cartridge 46 and a black cartridge 47. A clock lever 48 serves as a guide for the cartridge and defines the cartridge in a predetermined position. The ink the distributing pipes 41 moves as indicated by solid-lined arrows by vertical movement of a piston 43 of a pump 42, and moves as indicated by broken-lined arrows by the air pressure communicating with the cartridges. The pump 42 has a common structure shown in FIG. 15, having an internal cylinder space 92 for generating a negative pressure, a tube 90 for sucking the waste ink from the recovery means, a valve 49 for generating a negative pressure and allowing passage of the waste ink when the piston is elevated, and an in-piston path 91. This pump distributes the waste ink into the cartridges, but, when the ink absorbent member of a cartridge becomes full, the overflowing waste ink is guided to the ink absorbent member of the other cartridge, so that a conventional drawback of these devices can be solved.

Figure 16:
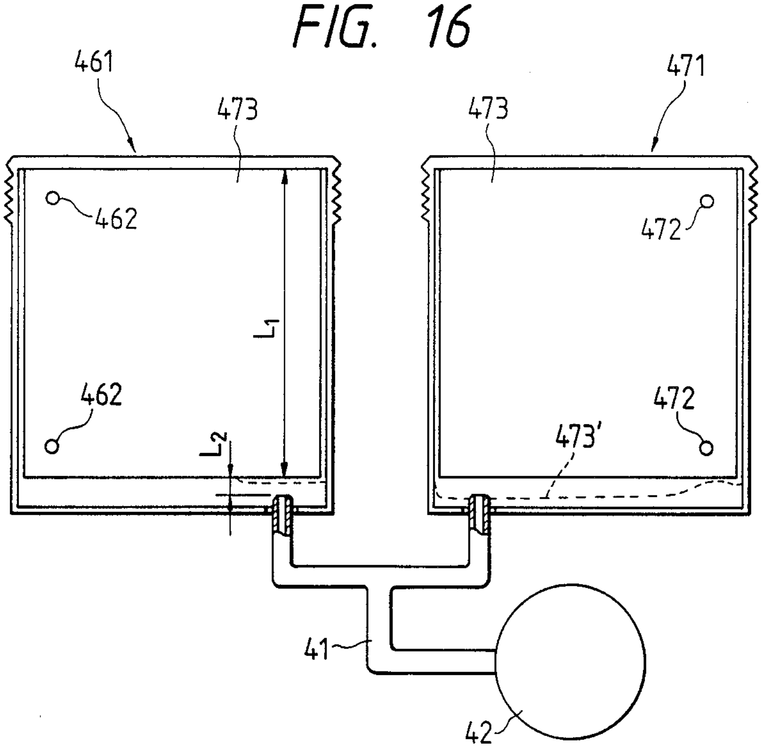
FIGS. 16 and 17 are schematic views of a principal portion of other embodiments of the present invention.
Figure 17:
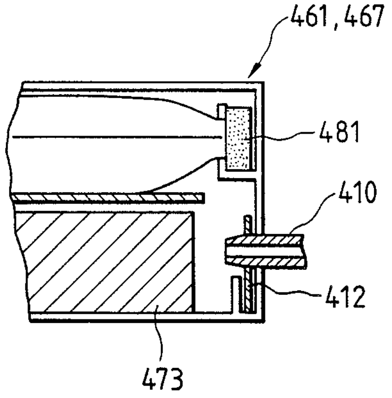

FIGS. 16 and 17 show another embodiment of the recovery of distributed ink. In this embodiment, when an ink absorbent member 473 in the cartridge 469 or 471 swells by ink absorption with the decrease of ink absorbing ability, it blocks the end portion 490 of the waste ink distributing pipes to increase the resistance to the waste ink from said pipe, so that the waste ink flow to the other cartridge where the fluid resistance is lower.

Positioning pins 462, 472 fix the absorbent member in the cartridge in such a manner that the end of the member 473 of a length L1 is positioned at a distance L2 from the end 410 of the distributing pipe 41. An ink bag in the color cartridge 461 or black cartridge 471 is sealed at the aperture thereof with a rubber stopper 481. The end portion 410 of the distributing pipe 41 is sealed by a packing 412 when inserted into the cartridge. If the absorbent member 473' of the black cartridge reaches the above-mentioned swelled state, the end portion of the pipe is blocked by the absorbent member as shown in FIG. 16, so that the waste ink is collected in the absorbent member 473 of the color cartridge. Thus, the ink leaking from the pipe end can be prevented at the replacement of the black cartridge. The recovering ability for the waste ink is restored by the replacement of the black cartridge, and the color cartridge is replaced before the absorbing ability of the black cartridge is reduced. In this manner the effect of the present invention can be continuously maintained.

Figure 18:
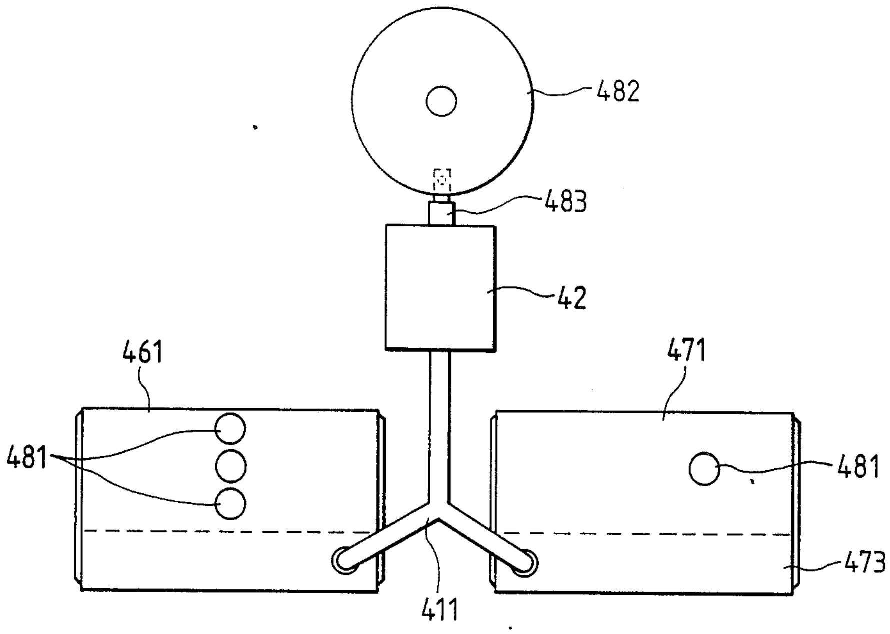
FIGS. 18 and 19 are schematic views of still other embodiments of the present invention.
Figure 19:
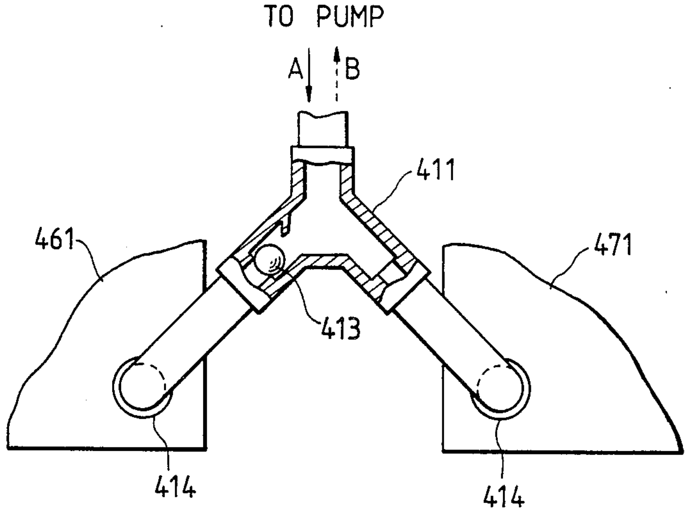

FIGS. 18 and 19 show an embodiment in which a valve mechanism is utilized to recover the waste ink principally in the black ink cartridge of the higher frequency of use, and collecting only the overflowing waste ink in the color cartridge.

A piston 483 of a pump 42 moves vertically by the rotation of a cam 482, executing distribution of the waste ink in a movement indicated by a solid-lined arrow, and air introduction from a vent of an absorbent member 473 in a movement indicated by a broken-lined arrow. A sealing rubber stopper 481 for each of the inks in the color cartridge or the ink of the black cartridge, is used for coupling with an ink supply portion composed for example of a needle. The distributing pipe in the present embodiment is inverted Y-shaped, and has a movable plastic ball 413 in a branch pipe toward the color cartridge 461. The ball normally closes the branch pipe leading to the color cartridge, and opens said path only when pushed upwards by the inverse air flow. Coupling holes 414 are provided for coupling the branch paths to the absorbent members 473 in the cartridges.

In the above-explained structure, the waste ink from the pump is principally recovered in the black cartridge. When the absorbent member therein becomes saturated with the waste ink, the inverse air flow no longer comes from the black cartridge but is principally obtained from the color cartridge. Consequently the ball 413 is lifted upwards, whereby the waste ink can be collected in the color cartridge. The branched pipes are provided therein with projections, so that the ball does not enter the branch pipe leading to the black cartridge.

It is thus made possible to recover the waste ink principally in the black cartridge with a higher frequency of use, and to effect the ink collection with the color cartridge while the black cartridge is replaced.

Also, if the above-mentioned projections for limiting the movement of the ball, the ball moves to the black cartridge side together with the inverse air flow when the absorbent member of the black cartridge is saturated with the ink, thereby further improving the efficiency of ink collection at the cartridge replacement. In this case, when the inverse air flow from the side of black cartridge increases at the replacement thereof, the ball moves to the side of the color cartridge, whereby the ink recovery is principally done in the black cartridge. Such automatic ball movement according to the ink recovery state in the absorbent members realizes appropriate ink distribution to the absorbent members..

In the present invention, the ball movement may naturally be replaced by appropriate valves explained before.

We claim:

1. An ink jet recording apparatus comprising:
- a plurality of ink cartridges containing inks of different colors;
- a plurality of recording heads, receiving ink from said cartridges and discharging an ink droplet from corresponding nozzles; and
- waste ink collecting means for collecting the waste ink exhausted from the nozzles in waste ink reservoirs of said plurality of ink cartridges, wherein said waste ink collecting means comprises an ink absorbent member provided in a waste ink reservoir of each of said plurality of ink cartridges.

2. An ink jet recording apparatus according to claim 1, wherein each recording head comprises a plurality of heat generating elements, and wherein said apparatus further comprises a recovery process mechanism for performing a recovery process for recovery of waste ink exhausted from said plurality of recording heads.

3. An ink jet recording apparatus comprising:
- a plurality of cartridges detachable from said apparatus body, each cartridge having a waste ink collection portion for collecting waste ink and an ink absorbing member for absorbing waste ink therein;
- a recovery process mechanism for performing a recovery process for recovering waste ink from recording means; and
- distributing means for collecting waste ink recovered by the recovery process and distributing the waste ink recovered by the recovery process to each waste ink collection portion, said distributing means having a branch portion branched to distribute waste ink to each absorbing member.

4. An ink jet recording apparatus according to claim 3, wherein said branch portion comprises said ink absorbing member.

5. An ink jet recording apparatus according to claim 3, wherein said recording means is a recording head for recording by discharging ink using thermal energy generated by heat generating elements and wherein said recovery process mechanism comprises means for exhausting waste ink in an area affected by the thermal energy.

6. An ink jet recording apparatus according to claim 3, wherein said branch portion defines a plurality of branch paths through which waste ink is distributed to said ink absorbing members, wherein said plurality of branch paths are at the same level.

7. An ink jet recording apparatus comprising:
- a plurality of cartridges detachable from said apparatus body, each cartridge having a waste ink collection portion for collecting ink or waste ink;
- a recovery process mechanism for performing a recovery process for recovering waste ink from recording means; and
- distributing means, connecting said recovery process mechanism to said plurality of cartridges, for distributing waste ink recovered by the recovery process to each waste ink collection portion.

8. An ink jet recording apparatus according to claim 7, wherein said recording means is a recording head for recording by discharging ink using thermal energy generated by heat generating elements and wherein said recovery process mechanism comprises means for exhausting waste ink in an area affected by said thermal energy.

9. An ink jet recording apparatus comprising:

a plurality of cartridges detachable from said apparatus body, each cartridge having a waste ink collection portion for collecting ink or waste ink;

a recovery process mechanism for performing a recovery process for recovering waste ink from recording means;

distributing means, connecting said recovery process mechanism to said plurality of cartridges, for distributing waste ink recovered by the recovery process by said recovery process mechanism to each waste ink collection portion; and ink detecting mans for detecting the amount of ink remaining in each waste ink collection portion, wherein said distributing means selectively distributes waste ink to said waste ink collection portions in accordance with the detecting by said detecting means.

10. An ink jet recording apparatus according to claim 9, wherein said recording means is a recording head for recording by discharging ink using thermal energy generated by heat generating elements and wherein said recovery process mechanism comprises means for exhausting waste ink in an area affected by the thermal energy.

11. An ink jet recording apparatus comprising:

a plurality of cartridges detachable from said apparatus body, each cartridge having a waste ink collection portion for collecting ink or waste ink;

a recovery process mechanism for performing a recovery process for recovering waste ink from a recording means;

distributing means, connecting said recovery process mechanism to said plurality of cartridges, for distributing waste ink recovered by the recovery process to each waste ink collection portion, said distribution means comprising:

a distribution pipe having a plurality of branches, each branch being connected to one of said waste ink collection portions; and means for selectively closing each of said plurality of branches.

12. An ink jet recording apparatus according to claim 11, wherein said selective closing means:

initially closes all but one branch, thereby leaving one branch open; and closes said open branch and opens a closed branch when said waste ink collection portion connected to said open branch is saturated with waste ink.

13. An ink jet recording apparatus according to claim 11, wherein each branch has a portion connected to said waste ink collection portion and having a projection and a portion lacking said projection, wherein said selective closing means comprises a ball positioned in a portion of one of said branches lacking said projection, wherein said ball and said projection are sized so that said ball is prevented from entering said portion of said branch having said projection and so that said ball blocks the flow of the waste ink from said recovery process mechanism to said waste ink collection portion connected to said branch housing said ball, and wherein one of said waste ink collection portions has a vent therein.

14. An ink jet recording apparatus according to claim 13, wherein each waste ink collection portion comprises an absorbent member for absorbing waste ink, wherein the vent is in one of said absorbent members.

15. An ink jet recording apparatus according to claim 14, wherein said distributing means further comprises a pump comprising a piston and a cam, wherein said piston is moved vertically in response to the rotation of said cam.

* * * * *

UNITED STATES PATENT AND TRADEMARK OFFICE

CERTIFICATE OF CORRECTION

PATENT NO. : 4,965,596

DATED : October 23, 1990

INVENTOR(S) : SHIGEYASU NAGOSHI, ET AL.

It is certified that error appears in the above-identified patent and that said Letters Patent is hereby corrected as shown below:

COLUMN 1

Line 47, "increase" should read --recent increase--.
Line 59, "a" should read --an--.

COLUMN 2

Line 13, "become" should read --will become--.
Line 14, "will" should be deleted.

COLUMN 4

Line 61, "provide" should read --provided--.

COLUMN 5

Line 49, "said sensors" should read --the sensors--.
Line 61, "said control sequences" should read --the control sequences--.
Line 66, "at" should read --during--.

COLUMN 7

Line 30, "a" should read --with a--.
Line 33, "not" should be deleted.
Line 49, "devise" should read --device--.
Line 60, "B:black);" should read --BK:black);--.

UNITED STATES PATENT AND TRADEMARK OFFICE
CERTIFICATE OF CORRECTION

PATENT NO. : 4,965,596

DATED : October 23, 1990

INVENTOR(S) : SHIGEYASU NAGOSHI, ET AL.

It is certified that error appears in the above-identified patent and that said Letters Patent is hereby corrected as shown below:

COLUMN 10

Line 28, "values" should read --valves--.
Line 44, "ink the" should read --ink in the--.
Line 66, "flow" should read --flows--.

COLUMN 12

Line 2, "members.." should read --members.--.

COLUMN 13

Line 16, "ink detecting mans" should read --ink detecting means--.

Signed and Sealed this

Fourth Day of August, 1992

Attest:

DOUGLAS B. COMER

*Attesting Officer* *Acting Commissioner of Patents and Trademarks*